Feb. 12, 1963   H. J. AXER   3,077,025
CUTTER HEAD

Filed Feb. 17, 1961   2 Sheets-Sheet 1

Feb. 12, 1963  H. J. AXER  3,077,025
CUTTER HEAD
Filed Feb. 17, 1961  2 Sheets-Sheet 2

United States Patent Office 3,077,025
Patented Feb. 12, 1963

3,077,025
CUTTER HEAD
Heinrich J. Axer, Neuss, Rhine, Germany, assignor to Schiess Aktiengesellschaft, Dusseldorf-Oberkassel, Germany
Filed Feb. 17, 1961, Ser. No. 90,129
5 Claims. (Cl. 29—105)

The present invention relates to a multi-tool cutter head, especially for finishing by means of its end face, which is adapted to be drawn tight against a spindle face perpendicular to the spindle axis, and which carries preferably hard metal tools. When finishing a work piece surface, the obtainment of a completely smooth surface similar to a ground surface is intended. Such surface can be obtained without difficulties for instance by turning at a proper cutting speed and a proper feed. However, when face milling by means of cutter heads which customarily in contrast to a turning operation operate with a plurality of cutters at one and the same time, the obtainment of a completely smooth surface causes difficulties. These difficulties are due primarily to the fact that all cutters have to be fastened to the cutter head so that their cutting edges are completely uniformly directed. If one of the cutters protrudes only slightly beyond the cutting plane, this protrusion will during the cutting operation produce a greater chip depth than the other cutters. The result is a non-permissible groove in the surface. This defect is even greater when the cutting surface of the cutter head is not precisely rectangular to the axis of rotation of the spindle, i.e. when the cutter head has a so-called plane beat (Planschlag). In such an instance, fine steps form in the surface of the work piece.

In an effort to avoid these difficulties, the finishing is frequently carried out by means of a single cutter only which cutter somewhat protrudes from the plane surface of the remaining cutters. Such a step, however, leads to a considerable reduction in the output because the chip cross section and the cutting speed can be increased to a rather limited extent only without endangering the life of the tool which already is subjected to a considerably greater wear than the other tools not employed for finishing.

In order to be able to overcome the drawbacks inherent in particular to the finishing operation of a cutter head equipped with hard metal tools, there exists the possibility to arrange the cutting edges of the cutters precisely in the cutting plane and to adjust the cutting edges precisely perpendicular to the axis of rotation of the spindle. In this way, each of the cutters would be acted upon by the forces corresponding to the permissible chip cross section, and the output could be multiplied over a one-cutter finishing.

The above mentioned first requirement could be met when grinding the cutter head with its tools on a good cutter head grinding machine, by moving all cutters in one plane with a tolerance of 0.002 millimeter.

It is an object of the present invention to provide a multi-tool cutter head which will make it possible to adjust the cutting edges of the tools precisely perpendicular to the axis of rotation of the spindle.

It is another object of this invention to provide a multi-tool cutter head with adjusting means by which deviations from the perpendicular location of the cutter to the axis of rotation of the spindle can be eliminated to the required extent.

These and other objects and advantages of the invention will appear more clearly from the following specification in connection with the accompanying drawings, in which.

Starting with a multi-tool head which is adapted to be drawn tight against a spindle end face perpendicular to the axis of the spindle, the cutter head body is in conformity with the present invention provided with fine adjusting means in addition to the connecting means around the axis of the cutter head, said fine adjusting means being axis parallel to said connecting means. The said fine adjusting means are adapted to be pressed against the end face of said spindle against the clamping force of the connecting means in such a way that the cutter head body will assume a coaxial position with regard to the spindle axis so that the cutting plane of the cutters will be perpendicular to the axis of the spindle. By means of this fine adjusting means, deviations from the perpendicular position of the cutter head relative to the axis of rotation of the spindle, which deviations normally amount to a few hundredths of a millimeter only, can be eliminated to the required extent of precision. Irregularities may occur for instance due to soiling of the surfaces of spindle and cutter head respectively to be drawn relative toward each other and also by a different tightening of the conveying means. By counter tightening the fine adjusting means in combination with the expansion of the connecting means, it can be obtained that the mentioned irregularities will be without influence upon the location of the cutter head with regard to the axis of the spindle.

More specifically, provision may be made that control chambers receiving a medium subjected to adjustable pressure will be employed as fine adjusting means while the cutter head body will through the intervention of said adjusting means rest on the clamping end face of the spindle. More specifically, the cutter head body may be provided with a number of bores around its axis. These bores are open on that side which is remote from the clamping end face of the spindle but are closed by an adjusting screw and have their interior filled with an only slightly compressible pressure fluid or plastic material. The pressure of this pressure fluid is adjustable by the adjusting screw and deforms the bottom of the bore in a diaphragm-like manner toward the clamping end face of the spindle so that the cutter head body rests against the clamping end face through the intervention of the deformed area sections of the cutter head body at the end face of the spindle. The elastic deformation of the bottom of the bores requires an adjustment of the adjusting screws to an extent which amounts to a multiple of the deformation of the stroke. Consequently, a relatively long adjusting stroke is available while the adjusting force is transferred through the only slightly compressible pressure fluid to the bottom of the bore. The said bottom is deformed according to its elasticity while the axial deforming stroke amounts to a fraction of the adjusting stroke of the screw only. In this way, a very fine adjustment is made possible.

Figure 1:
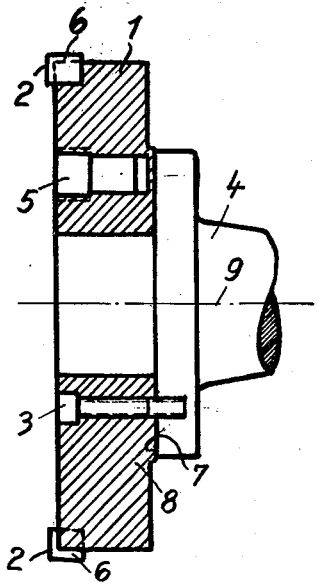
FIG. 1 illustrates a front view of a cutter head according to the present invention.
Figure 2:
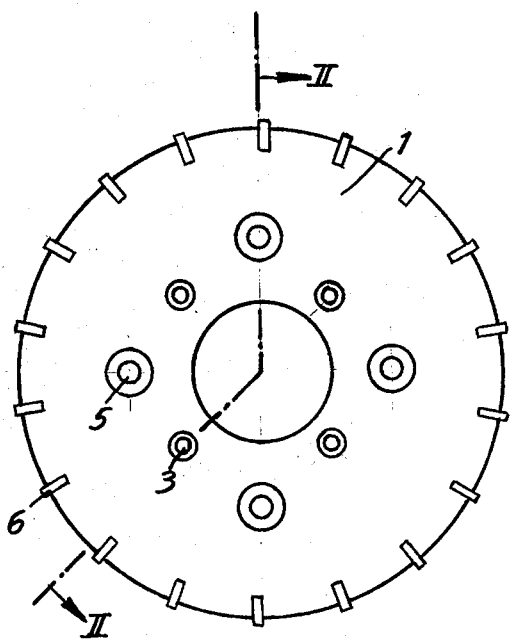
FIG. 2 represents a section along the line II—II of FIG. 1.

Referring now to the drawings in detail and FIGS. 1 and 2 thereof in particular, the structure shown therein represents a cutter head body 1 armed with a plurality of cutters 2. The cutter head body 1 is adapted to be connected to the end face 8 of a milling spindle 4 by means of screws 3. It will be appreciated that by tightening the screws 3, the cutter head body 1 can be firmly drawn against the end face 8 of the milling spindle 4. The adjusting means which serve for eliminating any deviations of the cutter head plane from its location perpendicular to the axis of rotation of spindle 9, are generally designated with the reference numeral 5.

If it is possible to move the cutter edges 6 of cutters 2 into one plane, the cutter head would rotate without lateral beat provided that the surface 7 of engagement of the cutter head body 1 and the end face 8 of the milling spindle 4 were located precisely perpendicular to the axis of rotation of the spindle. This, however, can be realized only at a certain tolerance. If then deviations from the desired position should add up in an unfavorable manner, the inclined position of the cutter head body 1 would amount to a magnitude which is non-permissible.

Figure 3:
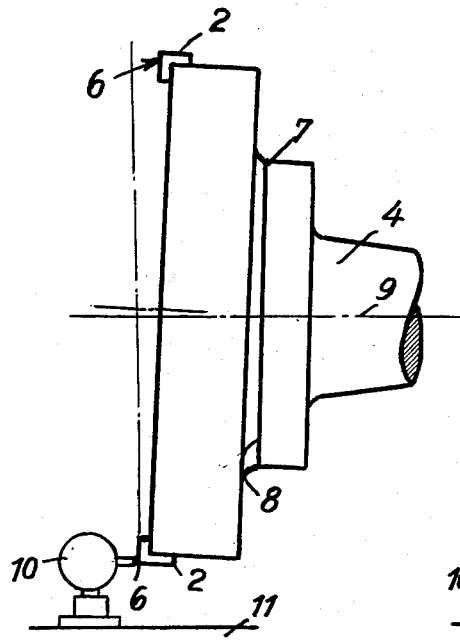
FIG. 3 shows a cutter head according to the invention after it has been connected to a milling spindle, while the cutter head face is not perpendicular to the axis of rotation of the spindle.

Such deviation or inclined position of the cutter head body 1 is shown in an exaggerated manner in FIG. 3. The lateral beat of the head may be measured for instance by a measuring clock 10 which is fastened to the clamping table 11 of the milling machine. Inasmuch as such milling machines are well known in the art, the milling machine has not been shown in the drawing.

Figure 4:
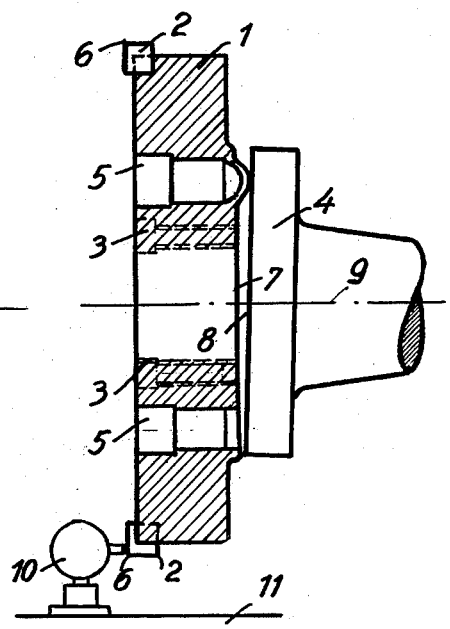
FIG. 4 shows a cutter head connected to the spindle and moved by the adjusting means according to the invention into a plane perpendicular to the axis of rotation of the spindle.

FIG. 4 indicates in detail how by actuating the respective adjusting means the cutting plane 6 of the cutters 2 may be pressed into the vertical position with regard to the axis of rotation 9. The adjusting means 5 act counter to the clamping force of the fastening screws 3 and locally press the cutter head surface 8 away from the clamping end face 7 to such an extent that the cutter head axis will be precisely coaxial with regard to the axis of rotation 9 of the spindle while the cutter head surface 8 will be precisely perpendicular to the spindle axis 9. During such adjustment, the respective connecting screws 3 which are adjacent the adjusting means 5 will be subjected to a corresponding expansion.

Figure 5:
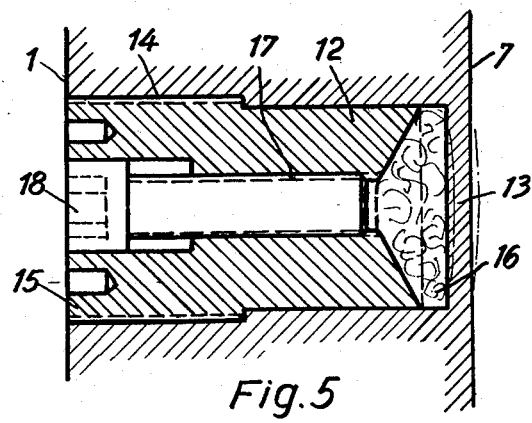
FIG. 5 shows on a somewhat larger scale than FIGS. 1 to 4 a section through adjusting means according to the invention.

In order to bring about that a minute displacement may be effected by adjusting means which themselves have an adjusting stroke greater than the distance by which the cutter knife has to be locally pressed away from the clamping end face 7, FIG. 5 illustrates by way of example and in conformity with the invention adjusting means in form of a control chamber by means of which the necessary fine sensitivity can be realized. As will be evident from FIG. 5, the cutter head body is provided with dead end bores 12 which at the end of the bores opposite the clamping surface 7 of the cutter head body 1 have a bottom 13 of a certain thickness. The dead end bore 12 is provided with a thread 14 into which is screwed a plug 15 so as to confine a hollow chamber 16 with the bottom 13. The chamber 16 is filled with a pressure fluid or a medium which is only slightly compressible, as for instance a plastic synthetic material, said pressure fluid or plastic material serving as pressure conveying substance. Such plastic synthetic material may consist for instance of a copolymer of vinyl chloride and acrylic acid esters with the addition of softeners. As softener may be used for instance ester or ketone. The plug 15 has a bore with an inner thread 17 and is threadedly engaged by an adjusting screw 18. Advantageously, a fine thread is employed in order to be able finely to adjust the adjusting or set screw 18. When tightening screw 18, the volume of said pressure fluid filled chamber 16 will be reduced. The pressure produced thereby is conveyed to the bottom 13 which diaphragm-like will bend outwardly. This bending force acts counter to the clamping force of the connecting screws 3 and presses the surface 7 of cutter head body 1 away from the clamping surface 8 of spindle 4 to the desired extent while simultaneously said connecting screws 3 are subjected to an expansion. With a corresponding ratio between diaphragm diameter and screw diameter and furthermore with a corresponding thickness of the diaphragm bottom 13, the necessary but only slight diaphragm bend of a few hundredths of a millimeter will require considerable turning movement of the adjusting screw 15 so that the desired sensitivity of the adjustment will be realized.

It is, of course, to be understood that the present invention is, by no means, limited to the particular construction shown in the drawings but also comprises any modifications within the scope of the appended claims.

Thus, instead of a control chamber as described in connection with FIG. 5, also other fine adjusting means may be employed which in a similar manner will be able to translate a relatively great adjusting stroke into a minute pressing stroke.

What I claim is:

1. In combination: a rotatable spindle having a mounting face perpendicular to the axis of rotation of said spindle, a rotatable cutter head comprising a first end face with a plurality of cutters having a cutting face, said cutter head also comprising a second end face opposite said first end face for connection with said mounting face of said spindle, said cutter head having a plurality of first bores extending from said first end face to said second end face all the way through said cutter head, said cutter head also having a plurality of dead end bores substantially parallel to said first bores but open only at said first end face, connecting bolts extending through said first bores and connecting said cutter head to said mounting face of said spindle, only slightly compressible substance contained in said second bores at the closed end thereof, and adjustable means adjustably arranged in said second bores and operable to exert pressure upon said substance, the bottom of said dead end bores being deformable in response to a certain minimum pressure exerted by said adjustable means upon said substance.

2. In combination: a rotatable spindle having a mounting face perpendicular to the axis of rotation of said spindle, a rotatable cutter head comprising a first end face with a plurality of cutters having a cutting face, said cutter head also comprising a second end face opposite said first end face for connection with said mounting face of said spindle, said cutter head having a first group of bores extending from said first end face to said second end face all the way through said cutter head, connecting bolts extending through the bores of said first group and connecting said cutter head to said mounting face of said spindle, said cutter head also comprising a second group of bores arranged around the axis of rotation of said cutter head and substantially parallel to said axis of rotation of said cutter head, said second group of bores being open at said first end face and being closed adjacent said second end face so as to leave a relatively thin deformable head portion between said second end face and the inner bottom surface of the bores of said second group, a plurality of adjustable screw means extending from said first end face into said second group of bores, and an only slightly compressible substance respectively interposed between each closed end of each bore of said second group of bores and the respective screw means therein, each of said screw means being adjustable selectively to vary the pressure on said substance to thereby selectively cause the substance to press the respective adjacent bottom portion of the respective bore of said second group of bores outwardly against said mounting surface of said spindle.

3. A cutter head for connection to a mounting face of a rotatable spindle, which comprises: a first end face with a plurality of cutters having a cutting face, said cutter head also comprising a second end face opposite said first end face and being connectable to the mounting face of a spindle, said cutter head having a plurality of first bores extending from said first end face to said second end face all the way through said cutter head, said cutter head also having a plurality of dead end bores substantially parallel to said first bores but open only at said first end face so as to leave a relatively thin deformable head portion between said second end face and the inner bottom surface of said dead end bores, only slightly compressible substance contained in said dead end bores at the closed end thereof, and adjustable means adjustably arranged in said dead end bores and operable to exert pressure upon said only slightly compressible substance to thereby deform the respective adjacent bottom of said dead end bores.

4. A cutter head according to claim 3, in which said only slightly compressible substance consists of a fluid.

5. A cutter head according to claim 3, in which said only slightly compressible substance consists of a copolymer of vinyl chloride and acrylic acid esters with the addition of a softener.

References Cited in the file of this patent

UNITED STATES PATENTS

| | | |
|---|---|---|
| 1,410,350 | Smith | Mar. 21, 1922 |
| 1,729,286 | Elfring | Sept. 24, 1929 |
| 2,327,685 | Weberg | Aug. 24, 1943 |